United States Patent [19]
Ritchie

[11] Patent Number: 5,507,522
[45] Date of Patent: Apr. 16, 1996

[54] HYBRID FRAME RAIL

[75] Inventor: Jack J. Ritchie, Washington, Mich.

[73] Assignee: The Budd Company, Troy, Mich.

[21] Appl. No.: 377,418

[22] Filed: Jan. 24, 1995

Related U.S. Application Data

[63] Continuation-in-part of Ser. No. 205,836, Mar. 3, 1994, Pat. No. 5,417,022.

[51] Int. Cl.⁶ ............................................. B62D 21/00
[52] U.S. Cl. .................. 280/800; 52/309.13; 52/731.6; 52/735.1
[58] Field of Search .................................. 280/794, 800, 280/786; 52/309.13, 729

[56] References Cited

U.S. PATENT DOCUMENTS

| | | | |
|---|---|---|---|
| 1,658,831 | 2/1928 | Blakeley | 52/729 |
| 1,818,121 | 8/1931 | Edwards et al. | 52/729 |
| 3,300,839 | 1/1967 | Lichti | 52/729 |
| 3,570,208 | 3/1971 | Nikal et al. | 52/727 |
| 4,070,845 | 1/1978 | Cody | 52/729 |
| 4,129,974 | 12/1978 | Ojalvo | 52/729 |
| 4,251,973 | 2/1981 | Paik | 52/729 |
| 4,576,849 | 3/1986 | Gardiner | 428/119 |
| 4,630,419 | 12/1986 | Pilgrim | 52/309.13 |
| 4,734,146 | 3/1988 | Halcomb et al. | 156/148 |
| 4,937,998 | 7/1990 | Goldberg | 52/729 |
| 5,042,395 | 8/1991 | Wackerle et al. | 105/397 |
| 5,112,422 | 5/1992 | Takahashi | 156/175 |
| 5,152,112 | 10/1992 | Eustace | 52/223.1 |
| 5,325,647 | 7/1994 | Forry et al. | 52/729 |

FOREIGN PATENT DOCUMENTS

| | | |
|---|---|---|
| 4-269249 | 9/1992 | Japan . |
| 8704207 | 12/1986 | WIPO . |

*Primary Examiner*—Kenneth R. Rice
*Attorney, Agent, or Firm*—Harness, Dickey & Pierce

[57] ABSTRACT

The present invention relates to a hybrid frame rail including a pair of metallic flanges separated by a composite web including a first and second sections, each section including a pair of elongated bands separated by a transversely extending wall which includes a plurality of protrusions integrally connected to complimentary protrusions provided on the complimentary web section. To manufacture the hybrid frame rail, the metallic flanges are attached over the elongated bands of the web such that the web is entrapped between the metallic flanges.

25 Claims, 2 Drawing Sheets

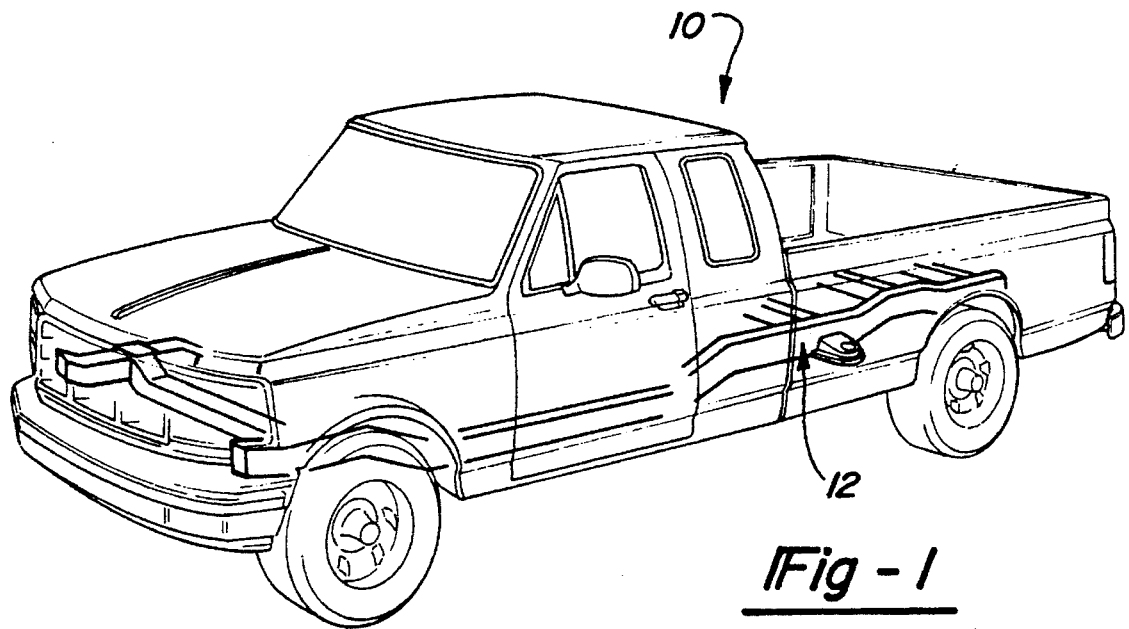
Fig-1
PRIOR ART
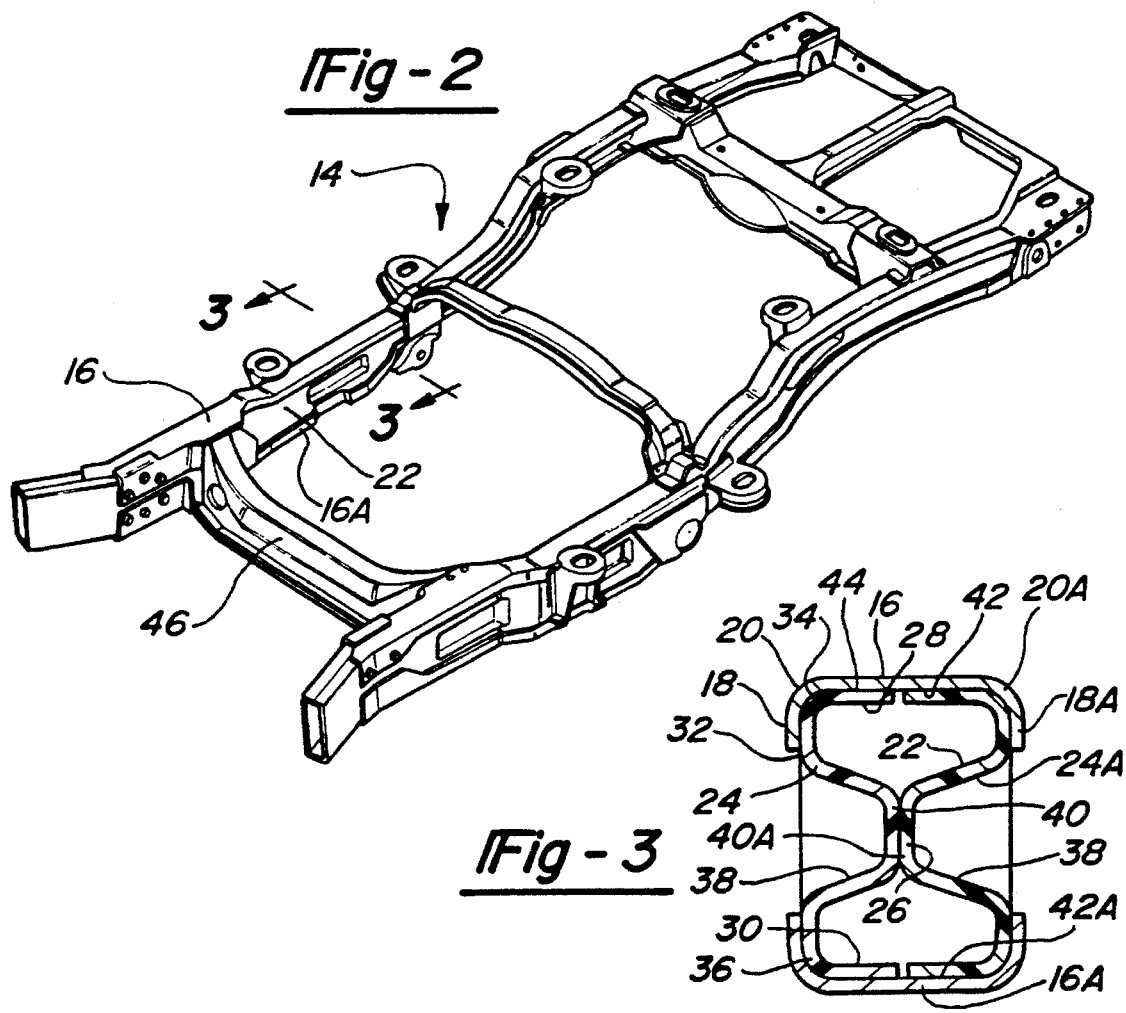

HYBRID FRAME RAIL

This application is a continuation-in-part of U.S. patent application Ser. No. 08/205,836 filed Mar. 3, 1994, now U.S. Pat. No. 5,417,022 issued May 23, 1995, entitled "Hybrid Frame Rail" which is hereby incorporated by reference.

BACKGROUND OF THE INVENTION

I. Technical Field

The present invention relates to a hybrid frame rail and, more particularly, to a hybrid frame rail including a pair of metallic flanges separated by a composite web extending along a specified length of the frame rail.

II. Discussion

In the automobile industry, there has been a relatively recent trend toward limiting the overall weight of automotive vehicles. Automobiles which are lighter in weight tend to offer better fuel efficiency and often are less expensive to produce and manufacture. As a result of this trend, much attention has been given to reducing the weight of various components, such as body panels, including but not limited to, door panels, deck lids, body side panels, hoods, truck lids and headliners, among others. Materials such as lightweight aluminum alloys, ceramics, high durable plastics and foams are often used to form such lightweight body panels.

Likewise, much attention has also been given to reducing the weight of vehicle engines, since engines account far a significant portion of the vehicles overall weight. For example, ceramic materials are now commonly uses in the production of engine components including the engine block itself. Ceramic materials tend to have a strength comparable to metals and offer good heat resistance characteristics.

With the advent of lighter weight body panels and vehicle engines the need for excessively heavy vehicle frames and chassis have been greatly reduced. Thus, the present invention is directed to providing a lightweight vehicle frame rail which is relatively inexpensive to produce and manufacture and which has enhanced load handling capabilities.

SUMMARY OF THE INVENTION

The present invention is primarily concerned with providing a hybrid frame rail which is relatively lightweight and structurally enhanced. In accordance with the teachings of the present invention, a hybrid frame rail is provided which includes a pair of spaced apart flanges and a composite web which extends therebetween. Preferably the flanges are made from a metallic material such as high tensile corrosion resistant steel or an aluminum alloy and the composite web is made from glass reinforced molding compounds.

The primary advantage of the present invention is a reduction in the overall weight of the automotive vehicle. By reducing the overall weight of the vehicle, a more fuel efficient vehicle can be produced.

Another object of the present invention is to provide a hybrid frame rail which resists deformation under heavy loads.

Yet another object of the present invention is to provide a hybrid frame rail which is relatively inexpensive and easy to manufacture.

Still another object of the present invention is a design which supplies the greatest design flexibility with the minimum investment cost.

BRIEF DESCRIPTION OF THE DRAWINGS

The various advantages of the present invention will become apparent to those skilled in the art after having the benefit of reading the following specification and by reference to the drawings in which:

FIG. 1 is a perspective view of an automotive vehicle, partially broken away, to show a conventional vehicle frame rail;

FIG. 2 is an assembled perspective view of a hybrid frame rail in accordance with the teachings of the present invention;

FIG. 3 is a cross-sectional view taken along lines 3—3 of FIG. 2 which illustrates the assembly of the hybrid frame rail.

DETAILED DESCRIPTION OF THE PREFERRED EMBODIMENT

Figure 4:
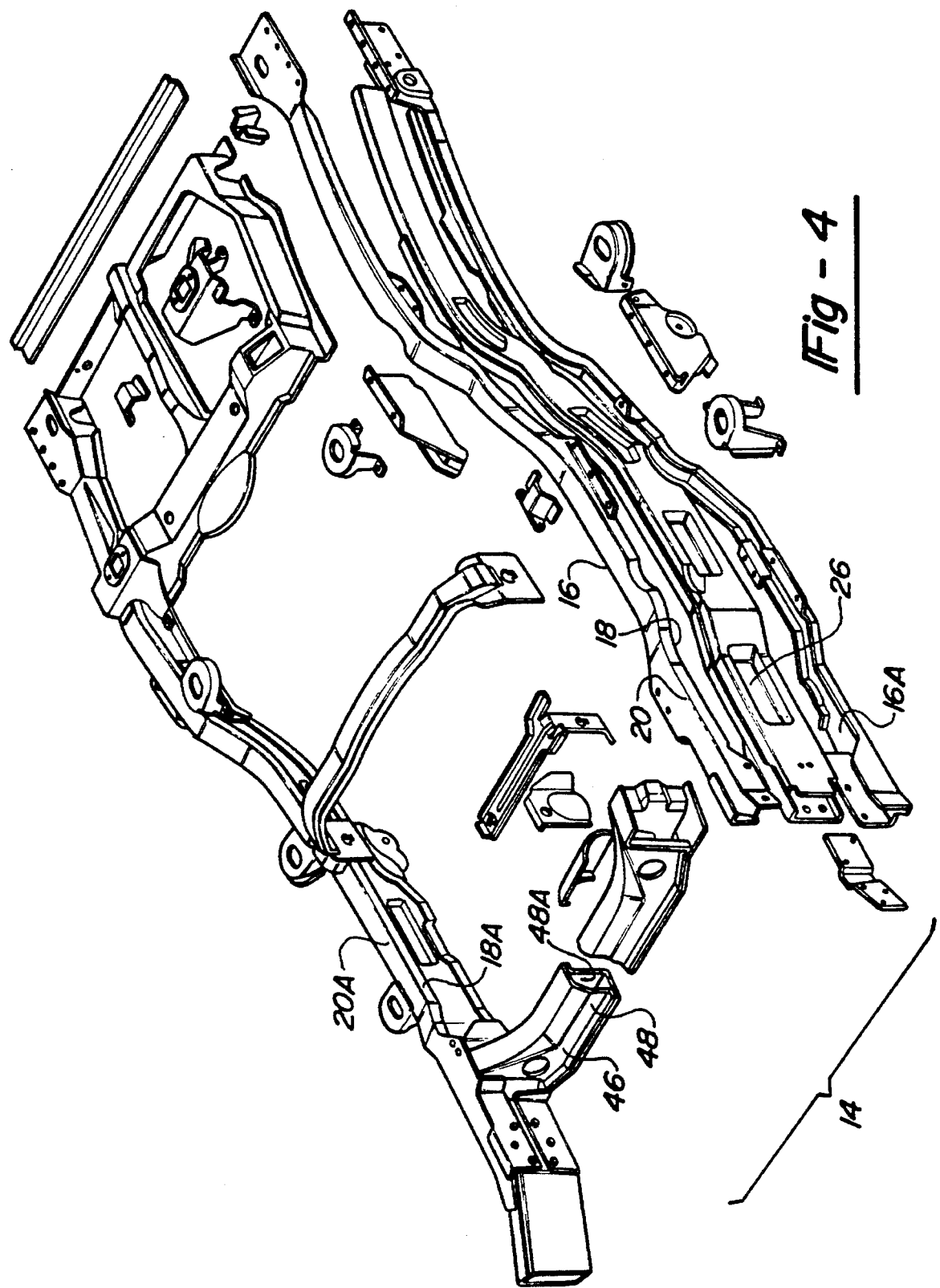
FIG. 4 is a broken apart perspective view of a hybrid frame rail including a composite cross-member.

As alluded to earlier, the methods and various embodiments of the present invention are directed to a hybrid frame rails having a pair of flanges and a composite web extending therebetween. From the outset, it should be understood that while the present invention will hereinafter be described with reference to a hybrid frame rails for use in association with automotive vehicles, other applications such as construction support members and the like are considered to be alternative uses within the scope of the present invention.

Referring to FIG. 1 a perspective view of an automotive vehicle 10 including a conventional vehicle frame rail 12 is provided. While conventional vehicle frame rails offer good structural characteristics, they are considered to be unnecessarily heavy and contribute to unacceptably low fuel efficiency, in that they are typically all metal constructions.

Under the present invention, as illustrated with reference to FIGS. 2 through 4, a hybrid frame rail 14 is provided which includes a pair of flanges 16 and 16A separated by a composite web 22. Preferably the flanges 16 and 16A, respectively, are elongated metallic strips made from a high tensile strength corrosion resistant steel. For automotive vehicle applications, typically each flange will have an average thickness in the range of between about 0.10 inches up to about 0.20 inches depending upon the manufactures specifications. The length of each flange is generally determinative upon the automotive vehicle's length and width.

Each flange preferably includes upwardly or downwardly extending lips 18 and 18A, depending upon the position of the flange relative to the web, disposed along both lateral edges 20 and 20A of the respective flange to assist in maintaining the composite web 22 therebetween upon assembly. The lips 18 and 18A may be in the form of elongated segments or in the form of spaced apart sections occurring intermittently along the length of the flange.

Extending between the first and second flanges 16 and 16A, respectively, is the composite web 22. Preferably, the convoluted web 22 is made from a glass reinforced compound or SMC having a tensile strength of at least 70 MPa or 10,1 50 PSI. As illustrated most clearly in FIG. 3, the web 22 typically is formed by integrally connecting two elongated web sections 24 and 24A. Ideally, the web sections 24 and 24A will be virtual mirror images of each other along any given length, since this type of construction will allow for both sections to be formed by a single mold if desired.

The web sections 24 and 24A are shown to each include a pair of elongated bands 28 and 30, respectively, spaced apart by an integrally attached wall 32. The wall 32 generally extends transversely between the elongated bands 28 and 30, with the wall ajoining the bands proximate to the outer edges 34 and 36 of first and second bands 28 and 30, respectively. As shown in FIG. 3, each web section 24 and 24A has an overall C-shape in cross-section.

Occurring along predetermined portions of each web are spaced apart protrusions 26 which generally include a peripheral portion 38 extending relatively transversely to the wall 32 and a substantially flat leading surface 40 and 40A disposed substantially parallel to the wall 32 from which it extends. While the leading surfaces 40 and 40A of each protrusion are shown to be substantially parallel to the wall 32, it should be understood by those skilled in the art that the leading surfaces of the protrusions can be angled relative to the walls 32 or convoluted so long as the leading surfaces 40 and 40A can be mated.

With regard to the manufacture of the embodiment illustrated in FIG. 3, generally an adhesive is applied to one or both leading surfaces 40 and 40A of two complimentary protrusions and the two leading surfaces are brought together such that they become bonded along the protrusions 26 to form a single integral structure. Thereafter, an adhesive material is applied to the inner surfaces 42 and 42A of each flange or the outer surfaces 44 and 44A of each elongated band 28 and 30, or both, and the flanges are brought into contact with the elongated bands, with the flanges preferably being disposed contiguously along the length of the elongated bands. Under this arrangement, the extending lips 18 and 18A preclude lateral movement of the web 22 between the flanges.

It should be understood that while adhesively bonding the flanges 16 and 16A to the composite web 22 with a commercially available adhesive such as epoxy or urethane based products is preferred, other means of attaching the composite web and flanges are possible. For example, mechanical fasteners such as nut and bolt assemblies, studs and rivets (not shown) can be utilized. Likewise, while it is preferred that the composite web be formed from separate web sections 24 and 24A which are adhesively joined together along complimentary protrusions, it is contemplated that the webs can be joined by mechanical fasteners as well. Still further, it may be desirable to form the web as a unitary structure initially, (i.e. a single structure including two distinct sections joined at the time of formation) or, alternatively, to not join the webs together at all, other than by contact occurring once the flanges are attached over the composite web.

The metallic upper and lower flanges 16 and 16A also allow for attachment to other frame components such as cross members, engine mounts or spring hangers by welding, riveting or bolting. For example, as illustrated in FIG. 2, a composite cross-member 46 is Shown to extend between first and second hybrid frame rails 14 and 14A of the overall frame assembly. The composite cross-member 46 includes first and second partially overlapping sections 48 and 48A, as shown in FIG. 4, which are assembled together and positioned in a tongue and groove-like manner prior to joining the metallic flanges 16 and 16A over the composite web 22. Once the cross-member is positioned to extend between the frame rails 14 and 14A, the metallic flanges 16 and 16A are attached to the composite web 22 in the above-described manner to entrap the ends of the cross-member, thus maintaining the cross-member in place.

In view of the foregoing, it can now be appreciated that the hybrid frame rail assembly offers significant advantages over other conventional frame rails. Among these advantages are a significant reduction in weight and greater design flexibility for improving structural capabilities in selected areas without penalizing the structure with unnecessary weight. In addition, this design is more flexible in its geometric shape for packaging around vehicle components as opposed to current stamped steel rails. Still other advantages will become apparent to those skilled in the art after having the benefit of a study of the specification, drawings and the following claims.

What is claimed is:

1. A hybrid frame rail, comprising:

a composite web including first and second sections, each section including a pair of elongated bands separated by a transversely extending wall, said walls having inwardly extending protrusions which are positioned adjacent to complimentary protrusions provided on the opposing web section; and a pair of metallic flanges wherein said metallic flanges are attached substantially contiguously over the elongated bands.

2. The hybrid frame rail of claim 1, wherein said first and second web sections are joined together along complimentary protrusions.

3. The hybrid frame rail of claim 2, wherein said complimentary protrusions are adhesively attached.

4. The hybrid frame rail of claim 1, wherein the height of the web walls is at least double the width of the flanges.

5. The hybrid frame rail of claim 1, wherein said web is made from a glass reinforced molding compound.

6. The hybrid frame rail of claim 5, wherein said web has a tensile strength of at least 70 MPa.

7. The hybrid frame rail of claim 1, wherein said flanges are made from a metal or metal alloy selected from the group consisting of high tensile strength corrosion resistant steels or high strength aluminum.

8. The hybrid frame rail of claim 1, wherein said flanges include lips which extend from the lateral edges thereof to preclude lateral movement of the composite web.

9. The hybrid frame rail of claim 1, wherein said hybrid frame rail includes at least one composite cross-member.

10. A hybrid frame rail, comprising:

a composite web including first and second integrally connected sections, each section including first and second elongated bands separated by an integral transversely extending wall having a plurality of spaced apart inwardly extending protrusions extending therefrom; and a pair of metallic flanges which are attached to said web such that a first flange is disposed contiguously over the first elongated band and the second flange is disposed contiguously over the second elongated band thereby sandwiching the composite web between the metallic flanges.

11. The hybrid frame rail of claim 10, wherein said composite web includes two integrally connected sections which are attached along complimentary inwardly extending protrusions to form a unitary structure.

12. The hybrid frame rail of claim 11, wherein said first and second integrally connected sections of the web are joined by an adhesive disposed between said complimentary protrusions.

13. The hybrid frame rail of claim 10, wherein the height of the web walls is at least double the width of the flanges.

14. The hybrid frame rail of claim 10, wherein said web is made from a glass reinforced molding compound.

15. The hybrid frame rail of claim 14, wherein said web has a tensile strength of at least 70 MPa.

16. The hybrid frame rail of claim 10, wherein said flanges include lips which extend from the lateral edges thereof to preclude lateral movement of the composite web.

17. The hybrid frame rail of claim 10, wherein said hybrid frame rail includes at least one composite cross member.

18. A hybrid frame rail, comprising:
- a composite web including first and second elongated bands separated by a substantial transversely extending wall; and
- a pair of metallic flanges which are attached to said web such that a first flange is disposed contiguously over the first elongated band and the second flange is disposed contiguously over the second elongated band thereby sandwiching the composite web between the metallic flanges.

19. A chassis for a vehicle, said chassis comprising:
- a pair of frame rails and at least one cross member, at least one of the frame rails including:
- a composite web including first and second elongated bands separated by substantially transversely extending wall, a first metallic flange attached to the first elongated band, and a second metallic flange attached to the second elongated band.

20. The chassis of claim 19 wherein the web includes first and second sections, each section including first and second elongated bands separated by a substantially transversely extending wall, and the walls of the first and second sections being secured together.

21. The chassis of claim 20 wherein the walls of each section have a plurality of spaced apart inwardly extending protrusions, and wherein said walls of the first and second sections are secured together at said protrusions.

22. The chassis of claim 20 wherein said first metallic flange bridges the first elongated bands of the first and second web sections, and wherein the second metallic flange bridges the second elongated bands of the first and second web sections.

23. The chassis of claim 20 wherein each of said first and second metallic flanges include lips extending from lateral edges thereof for engaging side portions of the first and second web sections.

24. The chassis of claim 19 wherein said metallic flanges are used to connect the cross member to the rails.

25. The chassis of claim 19 wherein said web is made from a glass reinforced molding compound.

* * * * *